US012407916B2

(12) United States Patent
Lawrence et al.

(10) Patent No.: US 12,407,916 B2
(45) Date of Patent: Sep. 2, 2025

(54) SYSTEMS AND METHODS FOR CAMERA CONFIGURATION

(71) Applicant: Tyco Fire & Security GmbH, Neuhausen am Rheinfall, WI (US)

(72) Inventors: Peter Lawrence, Lisburn (GB); Benjamin Campbell Anderson, Belfast (GB); Terence Neill, Lisburn (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 173 days.

(21) Appl. No.: 18/120,883

(22) Filed: Mar. 13, 2023

(65) Prior Publication Data
US 2023/0300447 A1    Sep. 21, 2023

Related U.S. Application Data

(60) Provisional application No. 63/269,586, filed on Mar. 18, 2022.

(51) Int. Cl.
*H04N 23/63* (2023.01)
*G06F 3/00* (2006.01)
*G06F 21/70* (2013.01)

(52) U.S. Cl.
CPC ......... *H04N 23/631* (2023.01); *G06F 3/005* (2013.01); *G06F 21/70* (2013.01)

(58) Field of Classification Search
USPC ....................................... 386/291
See application file for complete search history.

(56) References Cited

U.S. PATENT DOCUMENTS

| | | | |
|---|---|---|---|
| 10,013,548 B2 * | 7/2018 | Oberheide | ............ G06F 21/40 |
| 10,475,315 B2 | 11/2019 | Madar et al. | |
| 10,638,096 B1 * | 4/2020 | Lin | ................. G08B 13/19656 |
| 10,846,960 B1 * | 11/2020 | Lemberger | ............ G06V 20/63 |
| 10,855,469 B2 * | 12/2020 | Doyon | ................. H04L 63/083 |
| 10,887,562 B2 | 1/2021 | Ellerhold et al. | |
| 11,004,319 B2 | 5/2021 | Schieltz et al. | |

(Continued)

FOREIGN PATENT DOCUMENTS

EP    3896956 A1    10/2021

OTHER PUBLICATIONS

International Search Report and Written Opinion issued in corresponding International Application No. PCT/US2023/064251 dated Jun. 7, 2023.

*Primary Examiner* — Nigar Chowdhury
(74) *Attorney, Agent, or Firm* — ArentFox Schiff LLP (57) ABSTRACT

Example implementations include a method, apparatus and computer-readable medium for configuring a camera, comprising generating, for display on a computing device, a graphical user interface (GUI) for configuring a camera, wherein the camera is programmed to visually receive and execute configuration information. The implementations further include receiving, by the GUI, a selection of a network video recorder (NVR) type from a plurality of NVR types. Additionally, the implementations further include determining NVR settings for the camera based on the selection of the NVR type. Additionally, the implementations further include generating, for display on the GUI, a visual representation of the configuration information for the camera, wherein the configuration information comprises the NVR settings.

21 Claims, 5 Drawing Sheets

(56) References Cited

U.S. PATENT DOCUMENTS

| | | | |
|---|---|---|---|
| 11,190,737 B2* | 11/2021 | Dubois | H04N 23/90 |
| 12,002,338 B2* | 6/2024 | Jolivet | G08B 13/19656 |
| 12,041,131 B2* | 7/2024 | Pope | H04W 4/021 |
| 2010/0110212 A1* | 5/2010 | Kuwahara | H04N 23/60 |
| | | | 348/148 |
| 2017/0180624 A1 | 6/2017 | Renkis | |
| 2017/0186290 A1* | 6/2017 | Li | G08B 13/19645 |
| 2017/0264608 A1* | 9/2017 | Moore | G07C 9/257 |
| 2017/0278365 A1* | 9/2017 | Madar | H04N 7/181 |
| 2017/0280043 A1 | 9/2017 | Burke et al. | |
| 2017/0280488 A1* | 9/2017 | Kawasaki | H04L 61/5007 |
| 2018/0063120 A1* | 3/2018 | Kim | H04L 67/141 |
| 2018/0070001 A1* | 3/2018 | Nassor | G06V 20/52 |
| 2018/0096175 A1* | 4/2018 | Schmeling | G06F 1/3206 |
| 2019/0245713 A1* | 8/2019 | Lo | H04L 12/2834 |
| 2019/0258864 A1* | 8/2019 | Lee | G06T 11/206 |
| 2019/0318382 A1* | 10/2019 | Yang | G06Q 20/326 |
| 2019/0354921 A1* | 11/2019 | Bolta | H04W 4/33 |
| 2020/0193787 A1* | 6/2020 | Jolivet | G08B 13/19656 |
| 2022/0058393 A1 | 2/2022 | Calvert et al. | |
| 2023/0079451 A1* | 3/2023 | Drako | H04W 4/029 |
| | | | 348/143 |

* cited by examiner

SYSTEMS AND METHODS FOR CAMERA CONFIGURATION

CROSS-REFERENCE TO RELATED APPLICATIONS

This application claims the benefit of U.S. Provisional Application No. 63/269,586, filed Mar. 18, 2022, which is herein incorporated by reference.

TECHNICAL FIELD

The described aspects relate to camera systems.

BACKGROUND

Aspects of the present disclosure relate generally to camera systems, and more particularly, to configuring a new camera.

Some of the most expensive activities in installing a video security system are software provisioning and configuration. This applies to all devices, but is particularly important when there is a large number of similar devices (e.g., security cameras). There are a number of challenges including device discovery, network configuration, network video recorder (NVR) connection, etc. In terms of device discovery, cameras are connected to a network and are "headless," which means that an installer has to find out the IP address of each camera before he/she can access the configuration menu. In terms of network configuration, cameras are predominantly installed on an isolated network and require a static IP Address to be configured. This adds management overhead as someone needs to record and maintain the list of devices and corresponding IP addresses. It also introduces the potential for human error as someone has to manually configure the camera to match the entry in their list. In terms of an NVR connection, each camera must then be manually "added" to its corresponding NVR in order to stream. This is most commonly done on a per camera basis. There are NVR features to support bulk adding, but creating the input file is currently a manual process. After discovery, each camera must be manually configured with details of the customer account before it will start streaming to the cloud and in turn be visible on a cloud system (e.g., the CloudVue system).

Conventional camera systems are unable to address these issues. Accordingly, there exists a need for improvements in such camera systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for configuring a camera, comprising generating, for display on a computing device, a graphical user interface (GUI) for configuring a camera, wherein the camera is programmed to visually receive and execute configuration information. The method further includes receiving, by the GUI, a selection of a network video recorder (NVR) type from a plurality of NVR types. Additionally, the method further includes determining NVR settings for the camera based on the selection of the NVR type. Additionally, the method further includes generating, for display on the GUI, a visual representation of the configuration information for the camera, wherein the configuration information comprises the NVR settings.

Another example aspect includes an apparatus for configuring a camera, comprising a memory and a processor communicatively coupled with the memory. The processor is configured to generate, for display on a computing device, a graphical user interface (GUI) for configuring a camera, wherein the camera is programmed to visually receive and execute configuration information. The processor is further configured to receive, by the GUI, a selection of a network video recorder (NVR) type from a plurality of NVR types. Additionally, the processor further configured to determine NVR settings for the camera based on the selection of the NVR type. Additionally, the processor further configured to generate, for display on the GUI, a visual representation of the configuration information for the camera, wherein the configuration information comprises the NVR settings.

Another example aspect includes an apparatus for configuring a camera, comprising means for generating, for display on a computing device, a graphical user interface (GUI) for configuring a camera, wherein the camera is programmed to visually receive and execute configuration information. The apparatus further includes means for receiving, by the GUI, a selection of a network video recorder (NVR) type from a plurality of NVR types. Additionally, the apparatus further includes means for determining NVR settings for the camera based on the selection of the NVR type. Additionally, the apparatus further includes means for generating, for display on the GUI, a visual representation of the configuration information for the camera, wherein the configuration information comprises the NVR settings.

Another example aspect includes a computer-readable medium having stored instructions for configuring a camera, wherein the instructions are executable by a processor to generate, for display on a computing device, a graphical user interface (GUI) for configuring a camera, wherein the camera is programmed to visually receive and execute configuration information. The instructions are further executable to receive, by the GUI, a selection of a network video recorder (NVR) type from a plurality of NVR types. Additionally, the instructions are further executable to determine NVR settings for the camera based on the selection of the NVR type. Additionally, the instructions are further executable to generate, for display on the GUI, a visual representation of the configuration information for the camera, wherein the configuration information comprises the NVR settings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

One issue with camera installations, such as in a video security system, is that each individual camera is added to a network video recorder (NVR). Since every camera has a different IP address, installers now need to know each camera IP before they can start adding cameras to the NVR. This means that installers need to discover the camera and configure the IP address. Discovery is rife with challenges, including multiple subnets and layer 2 (L2) switches blocking broadcast traffic. In fact, there may be requirements for camera discovery to be limited or even disabled by default. All of this leads to wasted money and/or time, a lack of security, and/or installer frustration.

To overcome one or more of these issues, the present disclosure includes apparatuses and methods for configuring a new camera. In particular, a user may select an NVR type from a plurality of NVR types on a GUI presented on a computing device (e.g., a smartphone). A camera setup component installed on the computing device may determine NVR settings for the camera based on the selection of the NVR type, and generate a visual representation (e.g., a QR code) of the configuration information comprising the NVR settings. The visual representation may be displayed on the computing device for capture by the camera. When the camera captures the visual representation, the camera may convert the visual representation into the configuration information and apply the NVR settings for setup. Thus, the present disclosure provides apparatuses and methods that may improve the ease and efficiency of installing a new camera.

Figure 1:
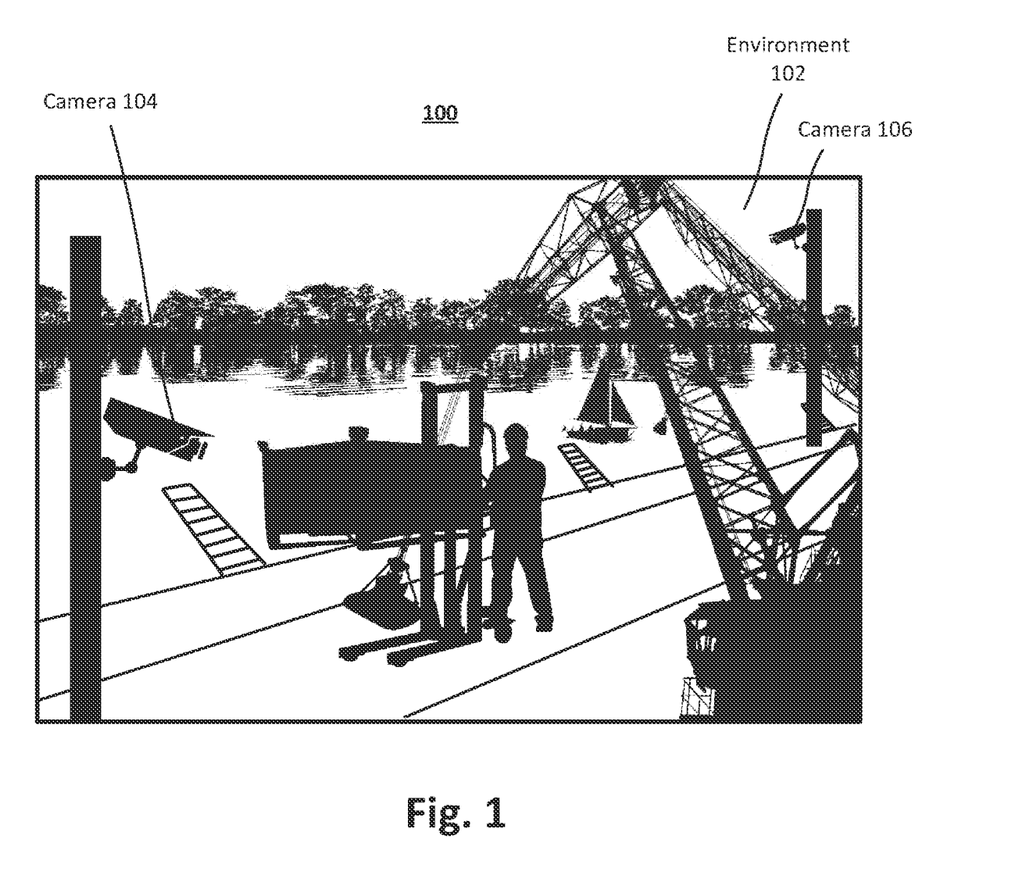
FIG. 1 is a diagram of an environment in which different cameras are to be set up, in accordance with exemplary aspects of the present disclosure.

FIG. 1 is a diagram 100 of environment 102 in which different cameras are to be set up, in accordance with exemplary aspects of the present disclosure. For example, but not limited hereto, environment 102 may be a construction site or a dock. Camera 104 and camera 106 may be security cameras that are mounted in different locations of environment 102. It should be noted that any number of cameras may be installed in environment 102, but only two are shown for simplicity. If a user intends to set up the cameras using methods of the present disclosure, the user may use a computing device such as a smartphone or a laptop to provide configuration information to the cameras. This configuration information may be provided using a physical transfer (e.g., installing a memory card into the cameras, inserting a flash drive into the cameras, etc.) or using a wireless transfer (e.g., displaying a QR code on the computing device for visual capture by the cameras).

Figure 2:
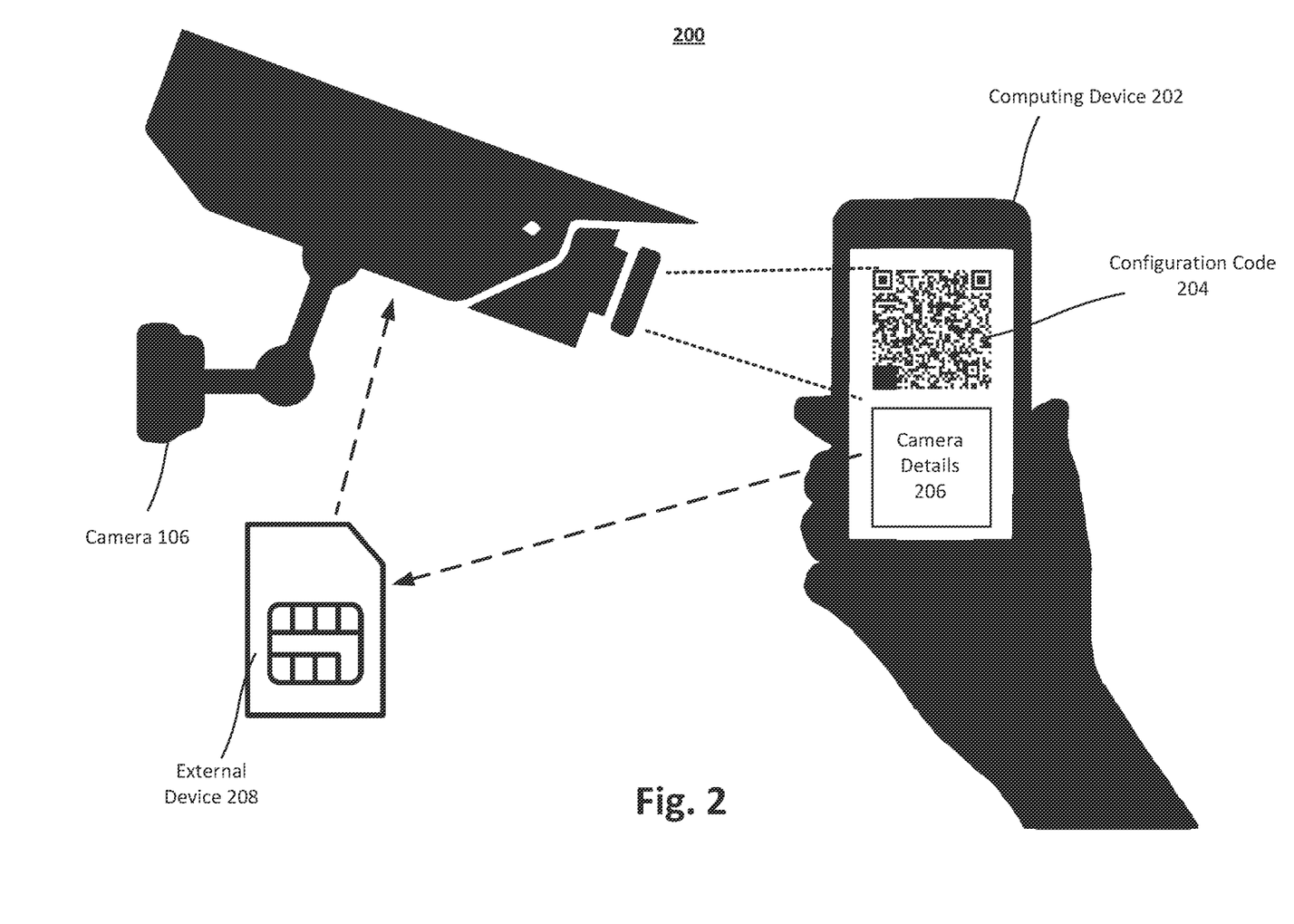
FIG. 2 is a diagram of a system for configuring a new camera, in accordance with exemplary aspects of the present disclosure.

FIG. 2 is a diagram of system 200 for configuring a new camera, in accordance with exemplary aspects of the present disclosure. Elaborating on the description of diagram 100, configuration information for camera 106 may be provided by a camera setup component (described in FIG. 3). The camera setup component may generate a GUI on computing device 202 and the user may interact with the GUI to select their desired settings to include in the configuration information of camera 106. In some aspects, the camera setup component may then store the configuration information on external device 208 (e.g., a memory card or a USB drive) that can be connected to camera 106. For example, the configuration information may be a plain text file. In some aspects, when generating text files for a plurality of cameras, the camera setup component may store the text files in a ZIP file.

In some aspects, the camera setup component may generate a visual representation of the configuration information. For example, the camera setup component may generate configuration code 204. In some aspects, camera details 206 may accompany configuration code 204 to indicate which camera needs to presented with configuration code 204. For example, in diagram 200, camera details 206 indicate a customer identifier "Harland & Wolf," a site "Belfast Docks," a location "building 6, main lobby," a camera name "front entrance," a camera IP address "192.168.1.168," a camera model "Illustra IPS02-D12-OI03," and an NVR type "VideoEdge 7." A user may place the screen of computing device 202 in the line of sight of camera 106, which may be configured to capture configuration code 204 and convert the code to the configuration information. Accordingly, a user is able to set up camera 106 without going through a wireless discovery process. The camera 106 may then be powered off and connected to a deployment network (or rebooted). Once the camera 106 reboots, it will automatically connect to the NVR via an application programming interface (API) and "add" itself based on the configuration information.

In some aspects, the camera setup component supports outputting configuration code 204 as a QR code with the following specification: Version 10, 57×57 Modules, Correction Level H, and Support for 174 Characters. The visual representation may be presented on an A4 page PDF layout with a minimum DPI for the QR code of 600 DPI. In some aspects, the layout allows for multiple QR pages to be exported as a single PDF.

It should be noted that for cameras with motorized lenses, a camera will often drift out of focus during transit. To ensure that the lenses are focused when the user is trying to display a configuration code, a software triggered auto-focus may be applied to all unconfigured cameras as they boot up. This auto-focus may be dependent on zoom levels. For example, due to the optics travel, Johnson Controls' ILLUSTRA cameras all ship with zoom in the middle position. The auto-focus may be configured such that during an auto-focus attempt, the outer element of the lens does not touch the outer tape used in packaging.

In terms of external devices, external device 208 may be a memory device, such as a memory card, readable by a personal computer and a camera (e.g., executing Linux or another operating system). Accordingly, the most widely used memory format (e.g., FAT32) may be used for external devices. In some aspects, the camera may re-format the card later, to be used for traditional camera functionality (e.g., onboard recording). Formatting external device 208 subsequent to setup may also prevent the configuration information from being accessed by an unauthorized entity (e.g., a hacker) that gains possession of external device 208. Otherwise, the unauthorized entity may determine security settings and exploit the camera for their own purposes.

Security is therefore one of the focuses of the present disclosure. The outputs from the camera setup component may contain sensitive information. For configuration codes, the camera setup component may offer the option to have the codes displayed on a mobile device (e.g., a tablet, a phone) so that the risk of them being misplaced is lessened. For external devices 208, the camera setup component may encrypt the file so that it cannot be accessed by anyone else. The decryption key may be pre-programmed into the default camera, which needs to know the key without any user configuration. For example, each camera may be shipped with a public key and a private key. In one approach, a user may plug in external device 208 into camera 106, which may be configured to automatically store the public key onto external device 208 when it is unconfigured (e.g., when the camera is in a factory setting). The camera setup component on computing device 202 may receive the public key via external device 208, and may encrypt the configuration file using the public key. The encrypted file may then be stored on external device 208 for transfer to camera 106. Camera 106 may decrypt the encrypted file using its private key and execute the configuration file.

If multiple cameras are being setup by the same external device 208 (e.g., a memory card), each file comprising configuration information may be encrypted such that only the camera that is designated a particular configuration information file will be able to decrypt the file. For example, multiple public keys can be gathered via external device 208. Each public key may be stored in a directory that is specific to a camera. The camera setup component on computing device 202 may store the configuration file for a particular camera in the directory associated with the camera and encrypt the stored configuration file. The external device 208 can thus be removed and connected to multiple cameras for efficient multi-camera setups. Each camera will only be able to successfully decrypt one configuration file using its private key—that configuration file is the one encrypted using its public key. For both options, a best practice guide that the system should be configured with interim (staging) credentials may be issued and then migrated to new credentials as the final stage of commissioning.

Figure 3:
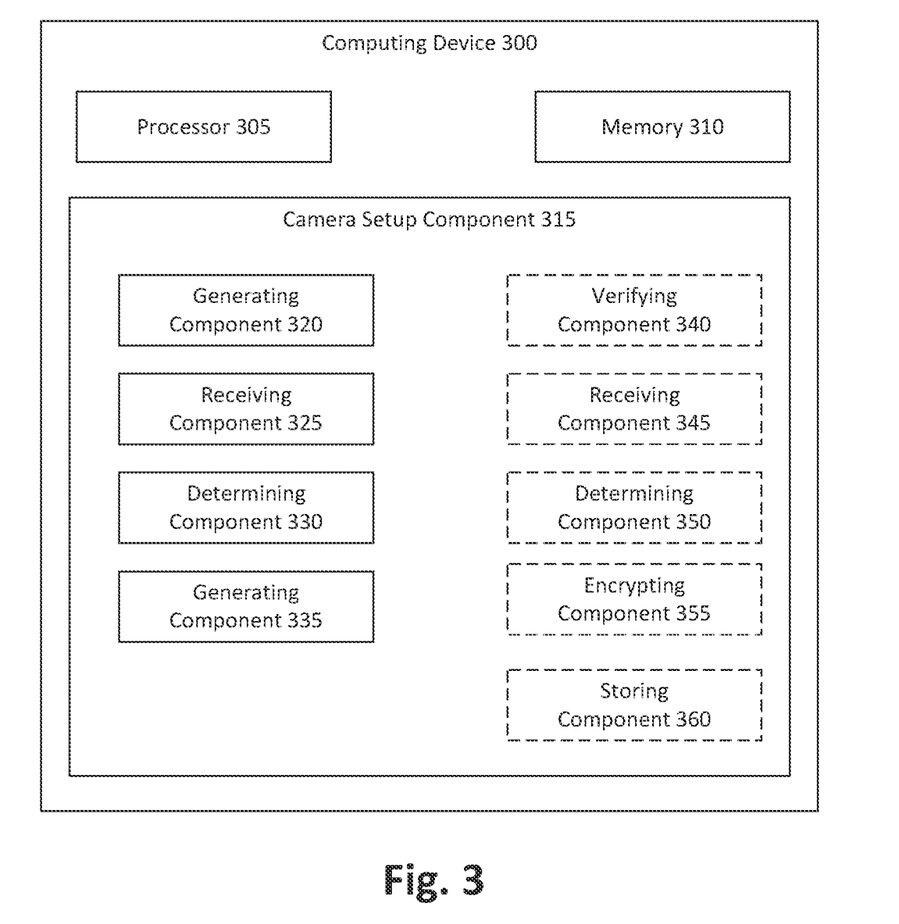
FIG. 3 is a block diagram of a computing device executing a camera setup component, in accordance with exemplary aspects of the present disclosure.
Figure 4:
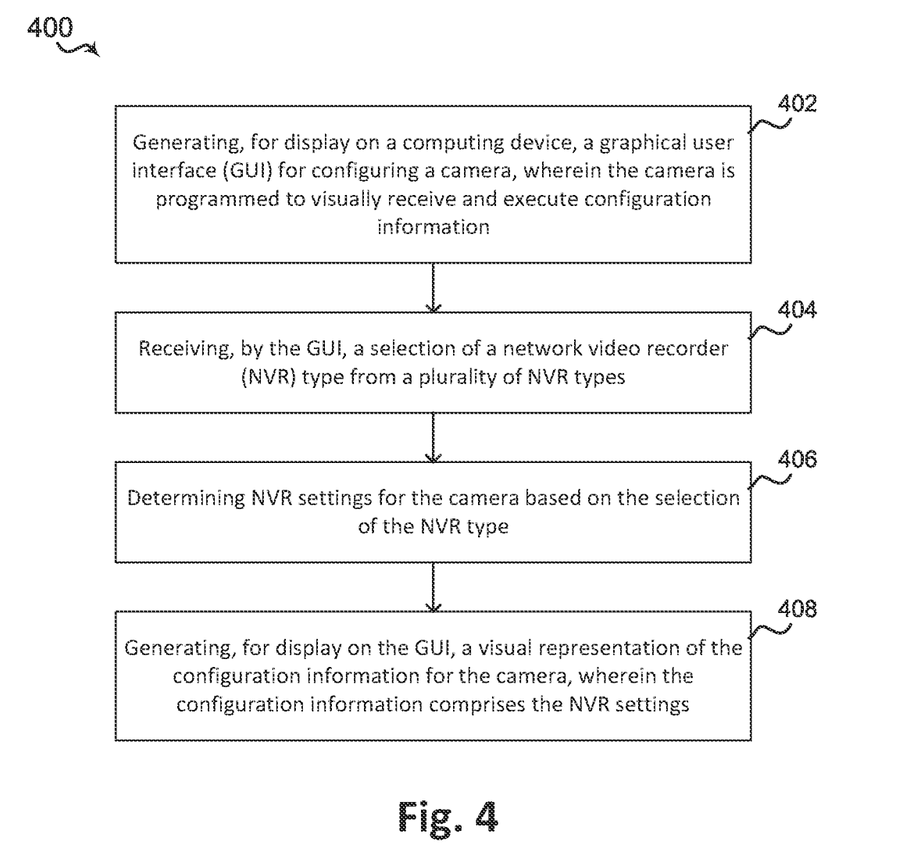
FIG. 4 is a flowchart illustrating a method of configuring a new camera, in accordance with exemplary aspects of the present disclosure.

Referring to FIG. 3 and FIG. 4, in operation, computing device 300 may perform a method 400 of wireless communication, by such as via execution of camera setup component 315 by processor 305 and/or memory 310.

At block 402, the method 400 includes generating, for display on a computing device, a graphical user interface (GUI) for configuring a camera, wherein the camera is programmed to visually receive and execute configuration information. For example, in an aspect, computing device 300, processor 305, memory 310, camera setup component 315, and/or generating component 320 may be configured to or may comprise means for generating, for display on computing device 202, a graphical user interface (GUI) for configuring camera 106, wherein camera 106 is programmed to visually receive and execute configuration information.

In some aspects, the GUI is a web-based portal that supports user accounts (with password protection) and has the ability to create, save, and retrieve setup projects for one or more environments. For example, a user may be able to configure a camera for a first environment using the GUI and may also be able to configure another camera for a second environment using the same GUI by accessing a particular user account linked to both environments. The first environment may be an office space and the second environment may be a home space.

At block 404, the method 400 includes receiving, by the GUI, a selection of a network video recorder (NVR) type from a plurality of NVR types. For example, in an aspect, computing device 300, processor 305, memory 310, camera setup component 315, and/or receiving component 325 may be configured to or may comprise means for receiving, by the GUI, a selection of a NVR type (e.g., VideoEdge 7) from a plurality of NVR types (e.g., CloudVue, Exacq, VideoEdge, etc.).

For example, a user may select VideoEdge 7 as the NVR type from a dropdown menu on the GUI listing the plurality of NVR types.

At block 406, the method 400 includes determining NVR settings for the camera based on the selection of the NVR type. For example, in an aspect, computing device 300, processor 305, memory 310, camera setup component 315, and/or determining component 330 may be configured to or may comprise means for determining NVR settings for the camera based on the selection of the NVR type.

In an aspect, the NVR settings of a first NVR type from the plurality of NVR types comprises: a host identifier, a username, a password, a camera security level, a camera IP address, and wherein the NVR settings of a second NVR type from the plurality of NVR types comprises: the host identifier, the username, the password, the camera security level, the camera IP address, and a security group identifier.

In a more specific example, Johnson Controls' CloudVue video surveillance and access control system deployments may include configuration of one or more of the following options: Partner Number, Data Center, HostID, New Username, New Password, Camera Security Level, Camera IP Address, Subnet, DNS, Gateway, Camera Name, and/or NVR Details. Johnson Controls' VideoEdge system may include configuration of the following options: HostID, New Username, New Password, Camera Security Level, Camera IP Address, Subnet, DNS, Gateway, Camera Name, VideoEdge IP Address, VideoEdge Username, VideoEdge Password, VideoEdge Security Group.

In an aspect, determining the NVR settings comprises receiving the NVR settings via the GUI. For example, the user may provide the exact values of pre-determined attributes of an NVR type. For example, the user may provide, via manual input (e.g., typing, pressing, speaking, gestures, etc.), values for HostID, Username, Password, etc., that are to be assigned to the new camera.

In an aspect, determining the NVR settings comprises loading pre-selected NVR settings from saved NVR profiles on the computing device. For example, camera setup component 315 may generate a default NVR profile for each NVR type. The default NVR profile may include values for each of the NVR settings associated with each NVR type. In some aspects, the user may be interested in configuring multiple cameras of the same NVR type. To prevent duplicate NVR setting values for each newly configured camera, camera setup component 315 may randomize or increment each value. For example, if the username for a first camera is "camera1," the username for a second camera may be set to "camera2." Camera setup component 315 may thus track the number of cameras being configured in order to prevent duplicate configurations (e.g., cameras with the same IP address).

At block 408, the method 400 includes generating, for display on the GUI, a visual representation of the configuration information for the camera, wherein the configuration information comprises the NVR settings. For example, in an aspect, computing device 300, processor 305, memory 310, camera setup component 315, and/or generating component 335 may be configured to or may comprise means for generating, for display on the GUI, a visual representation (e.g., configuration code 204) of the configuration information for camera 106, wherein the configuration information comprises the NVR settings.

In an aspect, the visual representation is one of: a QR code, a barcode, and a bitmap.

In an aspect, computing device 202 may serve as a web server. For example, camera setup component 315 on computing device 202 may be configured to host a website that stores the configuration information required to configure camera 106. The visual representation that is scanned by camera 106 may point to the website. For example, computing device 202 may output a QR code that points to a website hosted by computing device 202. When camera 106 scans the QR code, camera 106 connects to the website and can begin downloading the configuration information.

In order to ensure that the configuration information on the website is not accessed by other devices, camera setup component 315 may encrypt the configuration information such that only camera 106 can decrypt the configuration information. This encryption approach may involve private and public key exchanges as described previously. In some aspects, camera setup component 315 may generate a first QR code that points to a website that receives (e.g., via an upload) a public key of camera 106. Subsequent to scanning the first QR code, camera 106 may upload its public key to camera setup component 315. Camera setup component 315 may then generate configuration information, as described in method 400, and encrypt the configuration information with the public key. Camera setup component 315 may then generate a second QR code the points to a website storing the encrypted configuration information. Subsequent to scanning the second QR code, camera 106 may download and decrypt the encrypted configuration information from the website using its private key and execute the configuration details.

In an aspect, a first visual representation is generated for a first camera (e.g., camera 104) and a second visual representation is generated for a second camera (e.g., camera 106). For example, camera setup component 315 may generate a first QR code specific to camera 104 and a second QR code specific to camera 106.

Figure 5:
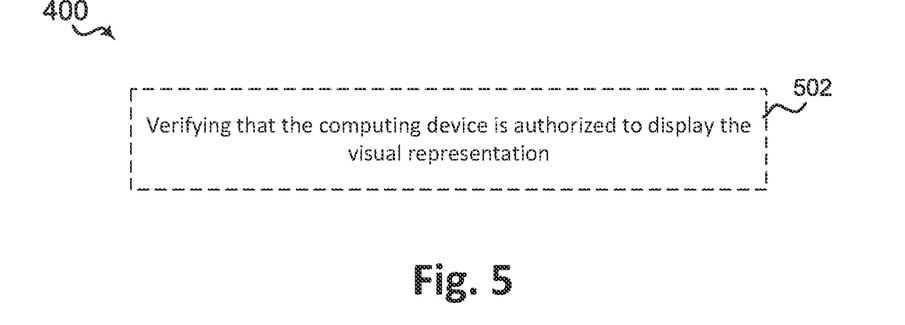
FIG. 5 is a flowchart illustrating a method of verifying that a computing device is authorized to display a visual representation, in accordance with exemplary aspects of the present disclosure.

Referring to FIG. 5, in an optional aspect, at block 502, the method 400 may further include verifying that the computing device is authorized to display the visual representation. For example, in an aspect, computing device 300, processor 305, memory 310, camera setup component 315, and/or verifying component 340 may be configured to or may comprise means for verifying that computing device 202 is authorized to display the visual representation. For example, an unauthorized person may maliciously attempt to reprogram a camera using a visual representation on his/her computing device. This occurrence can be detected if the computing device is not recognized as an authorized computing device. Verifying component 340 may determine that a computing device is authorized by determining whether the computing device is logged in (with proper user credentials) to camera setup component 315.

Figure 6:
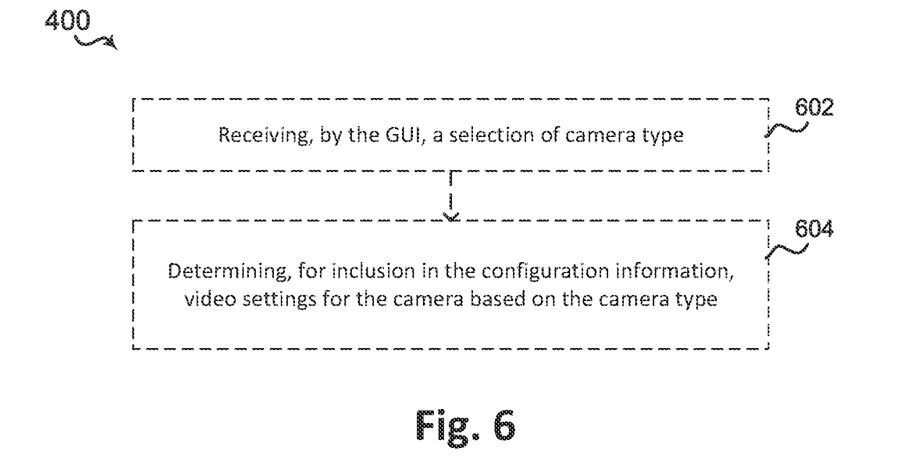
FIG. 6 is a flowchart illustrating a method of determining video settings for inclusion in the configuration information, in accordance with exemplary aspects of the present disclosure.

Referring to FIG. 6, in an optional aspect, at block 602, the method 400 may further include receiving, by the GUI, a selection of camera type. For example, in an aspect, computing device 300, processor 305, memory 310, camera setup component 315, and/or receiving component 345 may be configured to or may comprise means for receiving, by the GUI, a selection of camera type. For example, the camera may be of a certain model that has a various capabilities (e.g., a maximum resolution, a maximum zoom level, night mode, etc.). In some aspects, the camera type may be a camera model number or a media access control (MAC) address.

In this optional aspect, at block 604, the method 400 may further include determining, for inclusion in the configuration information, video settings for the camera based on the camera type. For example, in an aspect, computing device 300, processor 305, memory 310, camera setup component 315, and/or determining component 350 may be configured to or may comprise means for determining, for inclusion in the configuration information, video settings for the camera based on the camera type.

In an aspect, the video settings comprise a stream quality level (e.g., high, medium, low), a resolution (e.g., 720p), a bandwidth (e.g., high, medium, low), an amount of frames to capture per second (e.g., 60 fps), and environment modes (e.g., outdoor, indoor, night, gaming, etc.).

In some aspects, camera setup component 315 may further configure a camera network (e.g., DHCP/Static). In some aspects, a camera may update its IP address on the VMS (DHCP & Cloud scenario).

Figure 7:
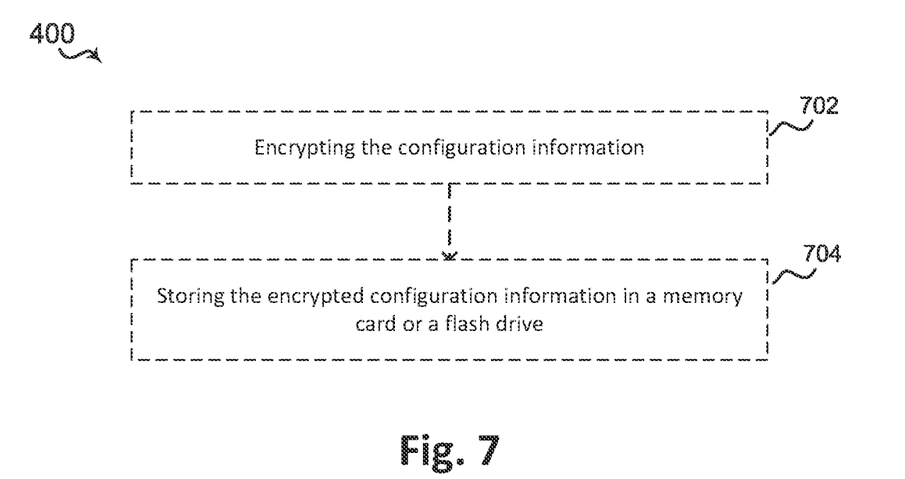
FIG. 7 is a flowchart illustrating a method of storing encrypted configuration information in a memory card or a flash drive, in accordance with exemplary aspects of the present disclosure.

Referring to FIG. 7, in an optional aspect, the method 400 may further include encrypting the configuration information. For example, in an aspect, computing device 300, processor 305, memory 310, camera setup component 315, and/or encrypting component 355 may be configured to or may comprise means for encrypting the configuration information.

For example, encrypting component 355 may apply algorithms such as Advanced Encryption Standard (AES), Rivet-Shamir-Adleman (RSA), Triple Data Encryption Standard (DES) to prevent the configuration information from be accessed by unauthorized users (e.g., a hacker attempting access the cameras).

In this aspect, at block 704, the method 400 may further include storing the encrypted configuration information in a memory card or a flash drive. For example, in an aspect, computing device 300, processor 305, memory 310, camera setup component 315, and/or storing component 360 may be configured to or may comprise means for storing the encrypted configuration information in a memory card or a flash drive (e.g., external drive 208).

It should be noted that the camera setup component 315 may send the alarm events via the same mechanism as is used today for A.I., Object Classification (i.e., Engine ID 4). In some aspects, the camera setup component may export a CSV file for manual upload to an NVR (e.g., VideoEdge). This may disable a camera from adding itself (GUI configuration only). The camera automatically uploads a configuration to Johnson Controls' VideoEdge system and automatically connects to Johnson Controls' CloudVue system, although other systems may be utilized.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for configuring a camera, comprising:
   generating, for display on a computing device, a graphical user interface (GUI) for configuring a camera, wherein the camera is programmed to visually receive and execute configuration information;
   receiving, by the GUI, a selection of a network video recorder (NVR) type from a plurality of NVR types;
   determining NVR settings for the camera based on the selection of the NVR type; and
   generating the configuration information for the camera, wherein the configuration information comprises the NVR settings, wherein a camera setup component on the computing device is configured to host a website that stores the configuration information for the camera;
   generating, by the camera setup component for display on the GUI, a first visual representation that points to the website that receives a public key of the camera;
   subsequent to scanning the first visual representation by the camera, receiving, at the camera setup component from the camera, the public key of the camera;
   encrypting, by the camera setup component, the configuration information with the public key such that only the camera can decrypt the configuration information;
   generating, by the camera setup component for display on the GUI, a second visual representation that points to the website storing the encrypted configuration information, the second visual representation, when scanned by the camera, enabling the camera to:
      download and decrypt the encrypted configuration information from the website using a private key of the camera; and
      execute the configuration information.

2. The method of claim 1, wherein the first visual representation is one of: a QR code, a barcode, and a bitmap.

3. The method of claim 1, wherein a visual representation is generated for a first camera and a different visual representation is generated for a second camera.

4. The method of claim 1, further comprising verifying that the computing device is authorized to display the first visual representation, wherein the first visual representation is not generated for display on unauthorized computing devices.

5. The method of claim 1, further comprising:
   receiving, by the GUI, a selection of camera type; and
   determining, for inclusion in the configuration information, video settings for the camera based on the camera type.

6. The method of claim 5, wherein the video settings comprise a stream quality level, a resolution, a bandwidth, an amount of frames to capture per second, and environment modes.

7. The method of claim 1, wherein determining the NVR settings comprises receiving the NVR settings via the GUI.

8. The method of claim 1, wherein determining the NVR settings comprises loading pre-selected NVR settings from saved NVR profiles on the computing device.

9. The method of claim 1, wherein NVR settings of a first NVR type from the plurality of NVR types comprises: a host identifier, a username, a password, a camera security level, a camera IP address, and wherein NVR settings of a second NVR type from the plurality of NVR types comprises: the host identifier, the username, the password, the camera security level, the camera IP address, and a security group identifier.

10. The method of claim 1, further comprising:
    storing the encrypted configuration information in a memory card or a flash drive.

11. An apparatus for configuring a camera, comprising:
    a memory; and
    a processor communicatively coupled with the memory and configured to:
       generate, for display on a computing device, a graphical user interface (GUI) for configuring a camera, wherein the camera is programmed to visually receive and execute configuration information;
       receive, by the GUI, a selection of a network video recorder (NVR) type from a plurality of NVR types;
       determine NVR settings for the camera based on the selection of the NVR type; and
       generate the configuration information for the camera, wherein the configuration information comprises the NVR settings, wherein a camera setup component on the computing device is configured to host a website that stores the configuration information for the camera;
       generate, by the camera setup component for display on the GUI, a first visual representation that points to the website that receives a public key of the camera;
       subsequent to scanning the first visual representation by the camera, receive, at the camera setup component from the camera, the public key of the camera;
       encrypt, by the camera setup component, the configuration information with the public key such that only the camera can decrypt the configuration information;
       generate, by the camera setup component for display on the GUI, a second visual representation that points to the website storing the encrypted configuration information, the second visual representation, when scanned by the camera, enabling the camera to:
          download and decrypt the encrypted configuration information from the website using a private key of the camera; and
          execute the configuration information.

12. The apparatus of claim 11, wherein the first visual representation is one of: a QR code, a barcode, and a bitmap.

13. The apparatus of claim 11, wherein a visual representation is generated for a first camera and a different visual representation is generated for a second camera.

14. The apparatus of claim 11, wherein the processor is further configured to verifying that the computing device is authorized to display the first visual representation, wherein the first visual representation is not generated for display on unauthorized computing devices.

15. The apparatus of claim 11, wherein the processor is further configured to:
receive, by the GUI, a selection of camera type; and
determine, for inclusion in the configuration information, video settings for the camera based on the camera type.

16. The apparatus of claim 15, wherein the video settings comprise a stream quality level, a resolution, a bandwidth, an amount of frames to capture per second, and environment modes.

17. The apparatus of claim 11, wherein to determine the NVR settings comprises to receive the NVR settings via the GUI.

18. The apparatus of claim 11, wherein to determine the NVR settings comprises loading pre-selected NVR settings from saved NVR profiles on the computing device.

19. The apparatus of claim 11, wherein NVR settings of a first NVR type from the plurality of NVR types comprises to: a host identifier, a username, a password, a camera security level, a camera IP address, and wherein NVR settings of a second NVR type from the plurality of NVR types comprises to: the host identifier, the username, the password, the camera security level, the camera IP address, and a security group identifier.

20. The apparatus of claim 11, wherein the processor is further configured to:
store the encrypted configuration information in a memory card or a flash drive.

21. A computer-readable medium having stored instructions for configuring a camera, the instructions executable by a processor to:
generate, for display on a computing device, a graphical user interface (GUI) for configuring a camera, wherein the camera is programmed to visually receive and execute configuration information;
receive, by the GUI, a selection of a network video recorder (NVR) type from a plurality of NVR types;
determine NVR settings for the camera based on the selection of the NVR type; and
generate the configuration information for the camera, wherein the configuration information comprises the NVR settings, wherein a camera setup component on the computing device is configured to host a website that stores the configuration information for the camera;
generate, by the camera setup component for display on the GUI, a first visual representation that points to the website that receives a public key of the camera;
subsequent to scanning the first visual representation by the camera, receive, at the camera setup component from the camera, the public key of the camera;
encrypt, by the camera setup component, the configuration information with the public key such that only the camera can decrypt the configuration information;
generate, by the camera setup component for display on the GUI, a second visual representation that points to the website storing the encrypted configuration information, the second visual representation, when scanned by the camera, enabling the camera to:
download and decrypt the encrypted configuration information from the website using a private key of the camera; and
execute the configuration information.

* * * * *